United States Patent [19]

Ochi et al.

[11] Patent Number: 5,246,678
[45] Date of Patent: Sep. 21, 1993

[54] HIGH-PERFORMANCE FLUE-GAS DESULFURIZATION PROCESS

[75] Inventors: Eiji Ochi; Kiyoshi Okazoe, both of Tokyo; Naohiko Ukawa; Susumu Okino, both of Hiroshima, all of Japan

[73] Assignee: Mitsubishi Jukogyo Kabushiki Kaisha, Tokyo, Japan

[21] Appl. No.: 821,706

[22] Filed: Jan. 16, 1992

[30] Foreign Application Priority Data

Jan. 22, 1991 [JP] Japan .................................. 2-20304

[51] Int. Cl.⁵ .................... C01B 17/00; C01B 17/22
[52] U.S. Cl. ......................... 423/243.08; 423/243.09
[58] Field of Search .......... 423/242 A, 243.08, 243.09

[56] References Cited

U.S. PATENT DOCUMENTS

| | | | |
|---|---|---|---|
| 4,040,803 | 8/1977 | Atsukawa et al. | 55/73 |
| 4,374,812 | 2/1983 | Atsukawa et al. | 423/242 |
| 4,614,645 | 9/1986 | Yoneda et al. | 423/240 |
| 4,696,804 | 9/1987 | Shinoda et al. | 423/242 |
| 5,034,028 | 7/1991 | Ukawa et al. | 423/242 |

FOREIGN PATENT DOCUMENTS 2534150 10/1983 France.
8702269 4/1987 PCT Int'l Appl.
2169888 7/1986 United Kingdom.

*Primary Examiner*—Gregory A. Heller
*Attorney, Agent, or Firm*—McAulay Fisher Nissen Goldberg & Kiel

[57] ABSTRACT

A desulfurization process which comprises the steps of bringing a combustion exhaust gas into contact with a gypsum slurry containing 1% or less of calcium carbonate in a first absorption tower, and then bringing the combustion exhaust gas into contact with a gypsum slurry containing 1% or more of calcium carbonate in a second absorption tower. $SO_x$ can be removed from a combustion exhaust gas with a high efficiency in accordance with a wet lime/gypsum method.

4 Claims, 2 Drawing Sheets

HIGH-PERFORMANCE FLUE-GAS DESULFURIZATION PROCESS

BACKGROUND OF THE INVENTION

1. Field of the Invention

The present invention relates to a process for removing sulfur oxides (hereinafter referred to as "$SO_x$") from a combustion exhaust gas with high absorption efficiency in accordance with a wet lime/gypsum method and an apparatus for carrying out this process.

2. Description of the Related Art

Processes have been known in which a combustion exhaust gas is treated in accordance with a wet lime/gypsum method to remove $SO_x$ from the gas. Some examples of conventional technology can be found in U.S. Pat. No. (USP) 4,374,812, wherein the addition of oxygen containing gas for oxidizing sulfur oxides is mainly discussed, U.S. Pat. No. 4,614,645, which discloses a method for treating effluent in an exhaust gas treatment apparatus, and U.S. Pat. No. 4,696,804, which discloses a method for treating $SO_2$, $SO_3$ and dust using a single tower, as well as in British Patent Application GB 2169888A, wherein a single column for wet desulfurization is discussed. However, when a conventional wet lime/gypsum method is used, the combustion exhaust gas is desulfurized merely to such an extent that the concentration of $SO_x$ in the desulfurized gas is several tens of ppm, because the conventional method is restricted by the required purity of calcium compounds, such as the by-product gypsum, produced from an absorbent ingredient material and by the economical amount of lime used.

SUMMARY OF THE INVENTION

In view of the above-mentioned state of the art, it is an object of the present invention to provide a high-performance flue-gas desulfurization process in accordance with a wet lime/gypsum method by which the desulfurization can be achieved to such an extent that the concentration of $SO_x$ in the desulfurized gas is 10 ppm or less, particularly 1 ppm or less, within an economical range for the amount of calcium compounds used as absorbent materials, while the purity of the by-product gypsum can be maintained at a purity level required in the industrial field of by-product gypsum.

The present invention provides the following methods:

(1) A high-performance flue-gas desulfurization process in accordance with a wet lime/gypsum method by which sulfur oxides are removed from a combustion exhaust gas, the process being characterized by the steps of bringing the combustion exhaust gas into contact with a gypsum slurry containing 1% or less of calcium carbonate in a first absorption tower, and then bringing the combustion exhaust gas into contact with a slurry containing 1% or more of calcium carbonate in a second absorption tower;

(2) the high-performance flue-gas desulfurization process according to (1) above wherein the calcium carbonate slurry present in the second absorption tower is fed to the first absorption tower to adjust a pH of the gypsum slurry present in the first absorption tower; and (3) the high-performance flue-gas desulfurization process according to (1) or (2) above wherein flying mist is removed from the combustion exhaust gas in a passage from the first absorption tower to the second absorption tower.

According to the present invention, a combustion exhaust gas can be desulfurized even to such an extent that an $SO_x$ concentration in the gas is 10 ppm or less, particularly 1 ppm or less, and by-produced gypsum can also be obtained with extremely high purity. In consequence, the present invention is very industrially valuable.

DETAILED DESCRIPTION OF THE PREFERRED EMBODIMENT

Figure 1:
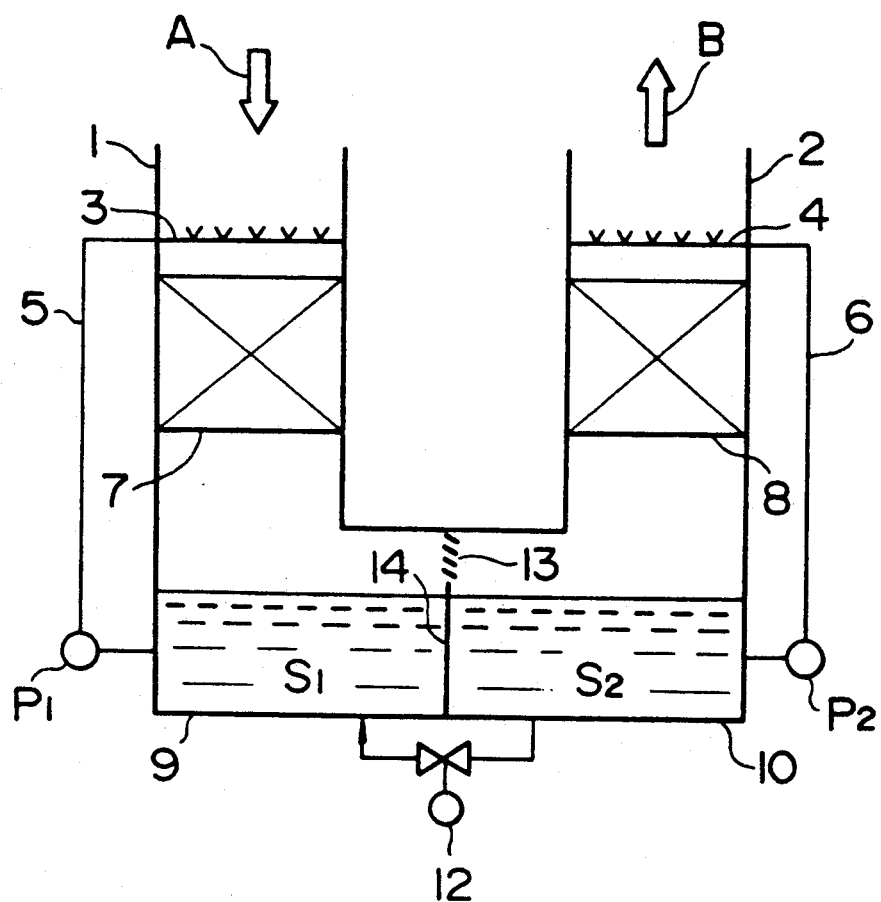
FIG. 1 shows an explanatory view illustrating one example of an apparatus for carrying out the present invention.

The function and effects of the present invention will be described in detail with reference to FIG. 1, which illustrates one example of an apparatus for carrying out the present invention.

A combustion exhaust gas A is introduced into a first absorption tower 1 and then brought into contact (e.g., by concurrent contact) with an absorbent, i.e., a slurry $S_1$ (a gypsum slurry containing 1% or less of calcium carbonate) sprayed through a first nozzle 3 via a pump $P_1$ and a first circulating line 5 from a first solution tank 9. Subsequently, the combustion exhaust gas A is passed through a first filling layer 7 which can be disposed according to its necessity. During this passage, the combustion exhaust gas A is desulfurized with calcium carbonate in the slurry $S_1$ and descends together with the slurry $S_1$. The slurry $S_1$ is then stored in the first solution tank 9, and the desulfurized exhaust gas is passed, for example, through an upper portion of a partition plate 14 disposed so as to separate the first solution tank 9 from a second solution tank 10, and the gas goes into a second absorption tower 2.

In this first absorption tower 1, $SO_x$ in the combustion exhaust gas A is absorbed and removed by calcium carbonate in the slurry $S_1$, and a combustion exhaust gas containing about 1,000 ppm of $SO_x$ is desulfurized to such an extent that the $SO_x$ concentration is about several tens of ppm. In this case, the calcium carbonate concentration in the slurry $S_1$ is 1% or less, and therefore, after the absorption of $SO_x$, the purity of gypsum in a slurry draw-off line (not shown) disposed on the first circulating line 5 increases. On the other hand, the concentration of calcium carbonate in the slurry $S_1$ is not high enough to sufficiently absorb and remove $SO_x$, and thus, for example, it is necessary to measure the pH of the slurry $S_1$ in the first solution tank 9 with a pH meter and adjust the pH of the slurry $S_1$. This will be described later.

In the second absorption tower 2, the exhaust gas forwarded from the first absorption tower 1 to the second absorption tower 2 is brought into contact (e.g., by concurrent contact) with an absorbent, i.e., a slurry $S_2$ (a slurry containing 1% or more of calcium carbonate) sprayed through a second nozzle 4 via a pump $P_2$ and a second circulating line 6 from the second solution tank 10. Subsequently, the exhaust gas is passed through a second filling layer 8 which can be disposed according to its necessity. During this passage, the combustion exhaust gas A is further desulfurized with calcium carbonate in the slurry $S_2$. The exhaust gas which has been desulfurized to an $SO_x$ concentration of about several tens of ppm in the first absorption tower 1 is desulfurized to an $SO_x$ concentration of 10 ppm or less, even to 1 ppm in particular, in the second absorption tower 2. Finally, the thus desulfurized gas is discharged as a desulfurized exhaust gas B from the second absorption tower 2.

The absolute amount of $SO_x$ which is absorbed by absorbent slurry $S_2$ circulating through the second absorption tower 2 is small, and therefore the concentration of calcium carbonate in the slurry $S_2$ in the second solution tank 10 decreases only slightly. Nevertheless, since the concentration of calcium carbonate gradually decreases, calcium carbonate is added to the second solution tank 10 in accordance with the decreasing amount of the absorbent. Therefore, the concentration of calcium carbonate in the slurry $S_2$ in the second solution tank 10 is always higher than that of the slurry $S_1$ in the first solution tank 9, and the slurry $S_2$ in the second solution tank 10 can be used to increase the pH of the slurry $S_1$ in the first solution tank 9, for example, by the use of a delivery line 11 and a control valve 12, so that the desulfurization power of the slurry $S_1$ in the first absorption tower 1 can be maintained.

It is preferred that a demister 13 is provided in the passage of the exhaust gas between the first and second absorption towers 1 and 2 so as to prevent flying mist present in the exhaust gas from running from the first absorption tower 1 into the second absorption tower 2. In the present invention, it is for improving the purity of the by-product gypsum that the combustion exhaust gas is brought into contact with the gypsum slurry containing 1% or less of calcium carbonate in the first absorption tower. The relation between the calcium carbonate concentration in the slurry and the purity of the by-product gypsum is shown in Table 1.

TABLE 1

| Calcium carbonate concentration in slurry | Purity of gypsum |
|---|---|
| 1.4 wt. % | 93% |
| 1.0 wt. % | 95% |
| 0.6 wt. % | 97% |
| 0.2 wt. % | 99% |

In general, it is preferable to obtain gypsum having a concentration of 95% or more, and so the results in the above-mentioned table indicate that the calcium carbonate concentration in the slurry in the first absorption tower should be set to 1% or less.

In the second absorption tower, the by-product gypsum is not collected from the slurry in the solution tank. In order to decrease the $SO_x$ concentration in the desulfurized gas which will be discharged as much as possible, the concentration of calcium carbonate which is used as absorbent is preferably higher, and therefore the calcium carbonate concentration in the slurry in the second absorption tower should be set to 1% or more.

Experimental Examples

For the establishment of the effect of an example shown in FIG. 1, this example will be described in comparison with flue-gas desulfurization systems of conventional methods shown in FIGS. 2 and 3.

Figure 2:
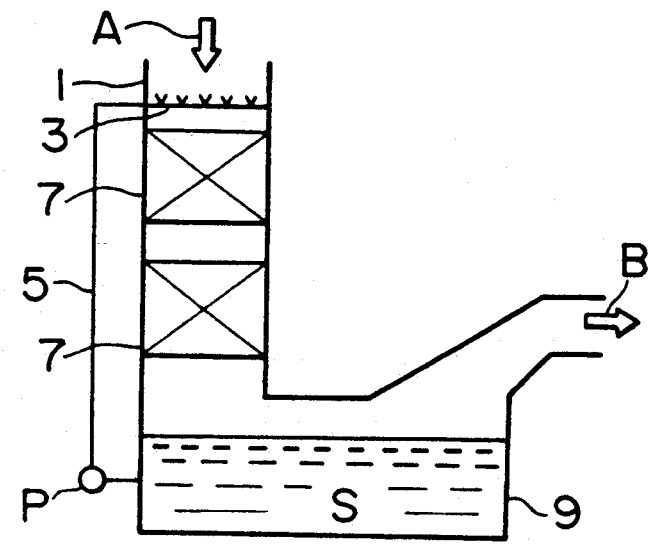
FIG. 2 shows an explanatory view illustrating one example of a conventional flue-gas desulfurization apparatus using one tower.

FIG. 2 shows a comparative example of a conventional flue-gas desulfurization method using one tower. In this drawing, reference numeral 1 indicates an absorption tower, 3 denotes a nozzle, 5 denotes a circulating line, 7 denotes a filling layer, 9 denotes a solution tank, S signifies a slurry which is an absorbent, and P signifies a circulating pump.

In the flue-gas desulfurization method using one tower shown in FIG. 2, $SO_x$ in a combustion exhaust gas A is absorbed and removed by the absorbent, i.e., the slurry S sprayed through the nozzle 3 via the circulating pump P, the circulating line 5 from the solution tank 9, and the thus desulfurized gas is discharged as a desulfurized exhaust gas B from the system.

Figure 3:
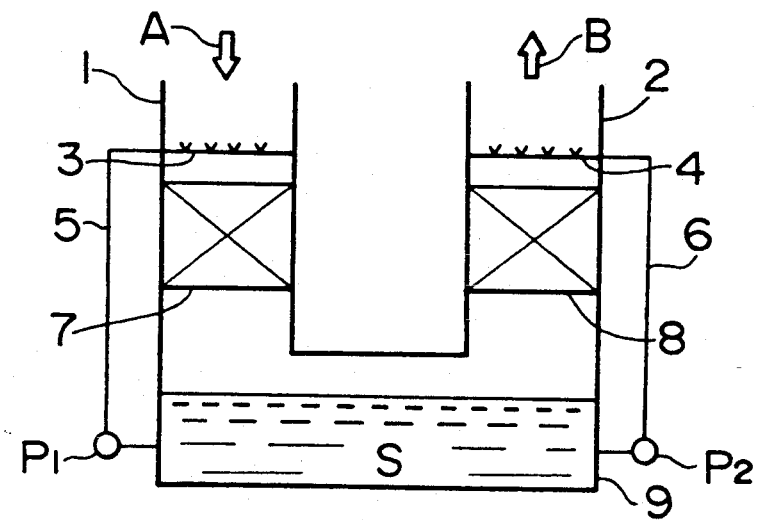
FIG. 3 shows an explanatory view illustrating one example of a conventional flue-gas desulfurization apparatus using two towers and one tank.

FIG. 3 shows a comparative example of a conventional flue-gas desulfurization method using two towers and one tank. In FIG. 3, the same reference numerals as in FIG. 1 denote the same members. The solution tank 9 consists of only one tank, being different from the example shown in FIG. 1. The absorbent slurry S stored in the solution tank 9 comprises one kind of slurry, as in the example with one tower shown in FIG. 2.

According to the flue-gas desulfurization method using the two towers and the one tank shown in FIG. 3, $SO_x$ in the combustion exhaust gas A is first absorbed and removed by the absorbent, i.e., by slurry S sprayed through the first nozzle 3 via a circulating pump $P_1$ and the circulating line 5 from the solution tank 9 in a first absorption tower 1. Subsequently, the exhaust gas A enters a second absorption tower 2 through the upper space of the solution tank 9. In this tower 2, $SO_x$ in the exhaust gas is removed therefrom by absorbent slurry S sprayed through a second nozzle 4 via a circulating pump $P_2$ and a second circulating line 6 from the solution tank 9, and the gas is discharged as a desulfurized exhaust gas B from the system.

Comparing the examples shown in FIGS. 1, 2 and 3 with respect to the height of the absorption towers and power (electric power) required to desulfurize an inlet combustion exhaust gas having an $SO_x$ concentration of 1000 ppm to an $SO_x$ concentration of 1 ppm under common conditions of L/G (L: the amount of the slurry; and G: the amount of the exhaust gas) =25.6, the results in the following table are obtained. However, in both examples shown in FIGS. 1 and 3, the desulfurization ratio in the first absorption tower is 98%, and the desulfurization ratio in the second absorption tower is 95%.

It is apparent from the results in this table that the example of the present invention shown in FIG. 1 can save costs in mechanical power.

TABLE 2

| | Example in FIG. 1 | Comparative Example in FIG. 2 | Comp. Example in FIG. 3 |
|---|---|---|---|
| Height of Absorption Tower | 1st Tower: 19 m 2nd Tower: 17 m | 35 m | 1st Tower: 19 m 2nd Tower: 18 m |
| Electric Power | | | |
| Pump | 3760 kW | 4520 kW | 3890 kW |
| Fan | 660 kW | 1170 kW | 710 kW |
| Total | 4420 kW | 5690 kW | 4600 kW |
| Purity of By-product Gypsum | 95% | 95% | 95% |

We claim:

1. A flue-gas desulfurization process in accordance with a wet lime/gypsum method by which sulfur oxides are removed from a combustion exhaust gas, said process comprising the steps of bringing the combustion exhaust gas into contact with a gypsum slurry containing no more than 1% of calcium carbonate in a first absorption tower, and then bringing said combustion exhaust gas into contact with a slurry containing at least 1% of calcium carbonate in a second absorption tower, and discharging the thus desulfurized gas.

2. The flue-gas desulfurization process according to claim 1 wherein the slurry in the second absorption tower is fed to the first absorption tower to adjust a pH of the gypsum slurry in the first absorption tower.

3. The flue-gas desulfurization process according to claim 1 wherein spray is removed from said combustion exhaust gas in passage from the first absorption tower to the second absorption tower.

4. The flue-gas desulfurization process according to claim 2 wherein spray is removed from said combustion exhaust gas in passage from the first absorption tower to the second absorption tower.

* * * * *